US010051098B2

(12) United States Patent
Kotab (10) Patent No.: US 10,051,098 B2
(45) Date of Patent: *Aug. 14, 2018

(54) IDENTIFYING CALLER NAME FOR OUTPUT ON MOBILE PHONE DEVICES

(71) Applicant: Dominic M. Kotab, San Jose, CA (US)

(72) Inventor: Dominic M. Kotab, San Jose, CA (US)

(73) Assignee: Dominic M. Kotab, San Jose, CA (US)

(*) Notice: Subject to any disclaimer, the term of this patent is extended or adjusted under 35 U.S.C. 154(b) by 10 days.

This patent is subject to a terminal disclaimer.

(21) Appl. No.: 15/013,890

(22) Filed: Feb. 2, 2016

(65) Prior Publication Data

US 2016/0156757 A1    Jun. 2, 2016

Related U.S. Application Data

(63) Continuation of application No. 12/697,069, filed on Jan. 29, 2010, now Pat. No. 9,264,867.

(60) Provisional application No. 61/148,896, filed on Jan. 30, 2009.

(51) Int. Cl.
  *H04M 3/42* (2006.01)
  *H04M 1/57* (2006.01)
  *H04W 4/16* (2009.01)
  *H04M 1/2745* (2006.01)

(52) U.S. Cl.
  CPC .............. *H04M 1/57* (2013.01); *H04W 4/16* (2013.01); *H04M 1/274508* (2013.01); *H04M 2250/60* (2013.01)

(58) Field of Classification Search
  CPC ....... H04W 4/00; H04W 4/003; H04W 4/008; H04W 4/12–4/18; H04W 4/206
  See application file for complete search history.

(56) References Cited

U.S. PATENT DOCUMENTS

| 6,782,086 B2 | 8/2004 | Clapper |
| 6,934,530 B2 | 8/2005 | Engelhart |
| 7,085,257 B1 * | 8/2006 | Karves .............. H04M 3/42093 370/352 |
| 7,231,229 B1 | 6/2007 | Hawkins et al. |

(Continued)

OTHER PUBLICATIONS

Kotab, D., U.S. Appl. No. 12/697,069, filed Jan. 29, 2010.
(Continued)

*Primary Examiner* — San Htun
(74) *Attorney, Agent, or Firm* — Zilka-Kotab, P.C.

(57) ABSTRACT

According to one embodiment, a method includes: receiving an incoming phone call on a mobile phone device; determining a phone number from which the incoming phone call originated; outputting the originating phone number on the mobile phone device; accessing a remote site for determining a name associated with the originating phone number; determining additional information associated with the originating phone number, the additional information including at least one of: a social network webpage, a work webpage, a personal webpage, a home address, a work address, a mailing address, a billing address, and an alternate phone number; and outputting the name and additional information associated with the originating phone number on the mobile phone device. Other methods, systems, and computer program products for determining a name associated with an incoming phone call are also described.

16 Claims, 4 Drawing Sheets

(56) References Cited

U.S. PATENT DOCUMENTS

| | | | |
|---|---|---|---|
| 9,264,867 B1 | 2/2016 | Kotab | |
| 2002/0026579 A1 | 2/2002 | Wiederin et al. | |
| 2002/0029178 A1 | 3/2002 | Wiederin et al. | |
| 2004/0146150 A1* | 7/2004 | Barnes | H04M 1/274516 379/142.15 |
| 2005/0232247 A1* | 10/2005 | Whitley | H04L 12/2803 370/352 |
| 2005/0250483 A1* | 11/2005 | Malik | H04L 51/38 455/415 |
| 2008/0101588 A1 | 5/2008 | Bruce et al. | |
| 2008/0188227 A1* | 8/2008 | Guedalia | H04M 15/00 455/445 |
| 2009/0088140 A1* | 4/2009 | Caspi | H04M 1/6066 455/415 |
| 2010/0086111 A1* | 4/2010 | Gruchala | H04M 3/42059 379/93.17 |

OTHER PUBLICATIONS

Non-Final Office Action from U.S. Appl. No. 12/697,069, dated Sep. 6, 2011.
Final Office Action from U.S. Appl. No. 12/697,069, dated Feb. 28, 2012.
Non-Final Office Action from U.S. Appl. No. 12/697,069, dated Jul. 8, 2013.
Final Office Action from U.S. Appl. No. 12/697,069, dated Mar. 12, 2014.
Non-Final Office Action from U.S. Appl. No. 12/697,069, dated Nov. 6, 2014.
Final Office Action from U.S. Appl. No. 12/697,069, dated Jun. 26, 2015.
Notice of Allowance from U.S. Appl. No. 12/697,069, dated Oct. 6, 2015.

* cited by examiner

IDENTIFYING CALLER NAME FOR OUTPUT ON MOBILE PHONE DEVICES

RELATED APPLICATIONS

This application is a continuation of U.S. patent application Ser. No. 12/697,069, filed Jan. 29, 2010, which claims priority to U.S. Provisional Patent Appl. No. 61/148,896, filed Jan. 30, 2009, which are herein incorporated by reference.

FIELD OF THE INVENTION

The present invention relates to identifying by name incoming phone calls on mobile phone devices.

BACKGROUND

Current mobile phone devices, such as mobile phones, Blackberry® devices, PALM® devices, etc., have the ability to identify incoming phone calls based on the originating phone number, as long as the originating phone number has an associated phonebook entry on the mobile phone device. However, if an incoming phone call originates from a phone number that is not associated with a phonebook entry on the mobile phone device, the mobile phone device shows only the originating phone number. This makes it difficult for the mobile phone device user to determine who might be calling.

Therefore, it would be beneficial for the mobile phone device to be able to determine, based on the originating phone number, a name associated with the originating phone number even when there is no associated phone book entry on the mobile phone device.

SUMMARY OF THE INVENTION

According to one embodiment, a method includes: receiving an incoming phone call on a mobile phone device; determining a phone number from which the incoming phone call originated; outputting the originating phone number of the incoming phone call on the mobile phone device; accessing a remote site for determining a name associated with the originating phone number of the incoming phone call; determining additional information associated with the originating phone number of the incoming phone call, the additional information including at least one of: a social network webpage, a work webpage, a personal webpage, a home address, a work address, a mailing address, a billing address, and an alternate phone number; and outputting the name and additional information associated with the originating phone number of the incoming phone call on the mobile phone device.

According to another embodiment, a system includes a processor and a non-transitory readable storage medium having computer program code embodied therewith, where the computer program code is readable and/or executable by the processor to cause the processor to: receive an incoming phone call on a mobile phone device; determine a phone number from which the incoming phone call originated; output the originating phone number of the incoming phone call on the mobile phone device; access a remote site to determine a name associated with the originating phone number of the incoming phone call; determine additional information associated with the originating phone number of the incoming phone call, the additional information comprising at least one of: a social network webpage, a work webpage, a personal webpage, a home address, a work address, a mailing address, a billing address, and an alternate phone number; and output the name associated with the originating phone number of the incoming phone call on the mobile phone device.

According to yet another embodiment, a computer program product includes a non-transitory computer readable storage medium having computer program code embodied therewith, where the computer program code is readable and/or executable by a processor to cause the processor to: receive incoming communication data on a mobile phone device, the incoming communication data being selected from the group consisting of: a phone call, a text message, a video message, and a picture message; determine a phone number from which the incoming communication data originated; output the originating phone number of the incoming communication data on the mobile phone device; access a remote site to determine a name associated with the originating phone number of the incoming communication data; determine additional information associated with the originating phone number of the incoming communication data, the additional information comprising at least one of: a social network webpage, a work webpage, a personal webpage, a home address, a work address, a mailing address, a billing address, and an alternate phone number; and output the name associated with the originating phone number of the incoming communication data on the mobile phone device.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as illustrative modes of use, reference should be made to the following detailed description read in conjunction with the accompanying drawings.

Various embodiments of the present invention are described in further detail below with reference to the figures, in which like items are numbered the same in the several figures.

DETAILED DESCRIPTION

The following paragraphs describe certain features and combinations of features that can be used in connection with each of the methods of the invention and embodiments, as generally described below. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation and scope including one or more meanings implied from the specification as well as one or more meanings understood by those skilled in the art and/or as defined in dictionaries, treatises, etc.

The following description is made for the purpose of illustrating the general principles of the present invention and is not meant to limit the inventive concepts claimed herein. Further, particular features described herein can be used in combination with other described features in each of the various possible combinations and permutations.

It must also be noted that, as used in the specification and the appended claims, the singular forms "a," "an" and "the" include plural referents unless otherwise specified.

According to one general embodiment, a method includes receiving an incoming phone call on a mobile phone device; determining a phone number from which the incoming phone call originated; outputting the originating phone number on the mobile phone device; accessing a remote site for determining a name associated with the originating phone number; and outputting the name associated with the originating phone number on the mobile phone device.

In another general embodiment, a system comprises a processor; a computer usable medium, the computer usable medium having computer usable program code embodied therewith, which when executed by the processor causes the processor to: receive an incoming phone call on a mobile phone device; determine a phone number from which the incoming phone call originated; output the originating phone number on the mobile phone device; access a remote site to determine a name associated with the originating phone number; output the name associated with the originating phone number on the mobile phone device; and a display for the outputting.

In another general embodiment, a computer program product for determining a name associated with an incoming phone call includes a computer usable medium having computer usable program code embodied therewith, the computer usable program code comprising: computer usable program code configured to receive an incoming phone call on a mobile phone device; computer usable program code configured to determine a phone number from which the incoming phone call originated; computer usable program code configured to output the originating phone number on the mobile phone device; computer usable program code configured to access a remote site to determine a name associated with the originating phone number; and computer usable program code configured to output the name associated with the originating phone number on the mobile phone device.

In another general embodiment, a method comprises receiving a phone number from a mobile phone device via a wireless connection; determining a name associated with the phone number; and sending the name associated with the phone number to the mobile phone device via a wireless connection.

Figure 1:
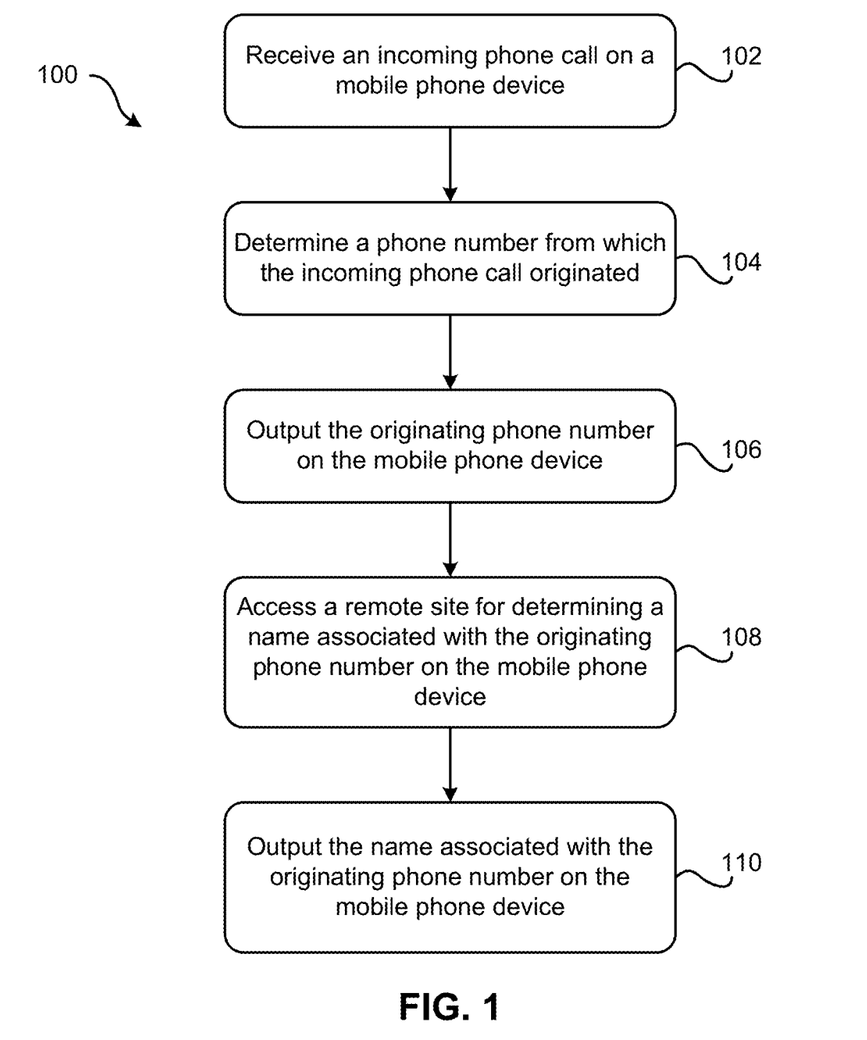
FIG. 1 depicts a method according to one embodiment.

Now referring to FIG. 1, a method 100 is shown according to one embodiment. The method 100 may be carried out in any desired environment.

With continued reference to FIG. 1, in operation 102, an incoming phone call is received on a mobile phone device. A mobile phone device may be any mobile device capable of receiving phone calls, such a mobile phone (e.g., Motorola® Droid®, MOTO® RAZR®, Apple® iPhone®, etc.), PALM® device, Blackberry® device, etc. Receiving an incoming phone call on the mobile device may comprise allowing actual verbal conversations, video conferencing, picture conferencing, etc., between a user using the mobile phone device and the person originating the incoming phone call; indicating that an incoming call has been or was taken on the mobile phone device; receiving and indicating an incoming phone call without a user answering the call; receiving and indicating a message has been received by the mobile phone device, such as a text message, video message, picture message, etc., with or without the user acknowledging or opening the message; etc.

In operation 104, a phone number from which the incoming phone call originated is determined. Any method known to one of ordinary skill in the art may be used to determine the originating phone number, including methods provided by mobile phone service providers, such as AT&T®, Verizon®, Sprint®, Metro PCS®, T-Mobile®, etc. In one approach, the number of the incoming call may be received from the phone service provider as part of the signal that indicates to the mobile phone that a call is incoming.

In operation 106, the originating phone number is output on the mobile phone device. According to some embodiments, the originating phone number may be output to the mobile phone device to a visual display of the mobile phone device. For example, when the incoming phone call is received, the originating phone number may appear on the display to alert a user that an incoming phone call is occurring or has been received. In another example, after an incoming call has been received (and possibly not answered), the originating phone number may be displayed in an incoming phone call log on the mobile phone device, e.g., a call history list, a missed call list, a received call list, a list of received messages (such as text messages, video messages, picture messages, voicemail messages, etc.), etc. In some more embodiments, the originating phone number may be output to a speaker of the mobile phone device for audible output to a user. Of course, the originating phone number may be output both audibly and visually. Moreover, the output of the originating phone number may be contemporaneous with the incoming call, may be output at a later time, may be output automatically or upon receiving a request from a user (e.g., by browsing to a call log), may be output in another form (for example, the originating phone number may be associated with a name, picture, sound, light, etc.), etc.

In operation 108, a remote site is accessed (e.g., contacted, communicated with, searched, etc.) for determining a name associated with the originating phone number. In one approach, the remote site may be a remote reverse phone number lookup service, possibly accessible through the internet, through a link with a mobile phone service provider, through a link with another system, etc. In one illustrative approach, the originating phone number is sent form the mobile phone device to the remote site, where a server, application program, website, etc., looks up a name associated with the number from a database, table, etc. having names associated with telephone numbers. The name associated with the number may be any name having any association with the number. For example, the person or entity to whom the originating phone number is registered with the telephone company may be the associated name. Moreover, a name may be associated with the number though the name is different than the person or entity to whom the number is registered with the telephone company. This information may be transmitted back to the mobile phone device for receipt by the mobile phone device.

Optionally, or alternatively, other information may be looked up, such as an address, a website (such as a social network webpage, work webpage, personal webpage, etc.), alternate phone number(s), etc., associated with the number. In addition, if an entity is associated with the number, more information may be returned, such as a business website, commercial website, entity type, etc. This information may be transmitted back to the mobile phone device for receipt by the mobile phone device. For simplicity, much of the present description refers to embodiments dealing with the name associated with the originating phone number. However, it should be kept in mind that the other information described above or known to one of skill in the art may be sent or received in addition to or as an alternative to the name.

In one embodiment, a user may be provided an option to perform a phone number search to determine a name associated with the originating phone number. If the user does not choose to perform a phone number search, then the name associated with the originating phone number is not determined. Additionally, a cost of determining the name associated with the originating phone number may be output to the user along with the option to perform the phone number search. In this fashion, a user may decide if it is worth the cost to determine the name associated with the originating phone number, and if the user decides that it is not worth the cost and does not select the option to lookup the name, the name will not be identified and the cost is not incurred.

Preferably, the accessing the remote site is performed with minimal user input. Thus, embodiments of the present invention can be distinguished from methods such as requiring the user to open a web browser, receiving a web address for a search page from the user, retrieving and opening the search page, requiring the user to input the number and request a search thereof, and receiving the results of the search. Rather, preferred embodiments provide automated retrieval of the name associated with the number either without receiving a specific user request for the information or upon receiving a simple user request. In one approach, the option to perform the phone number search may be provided in a menu accessible to the user from a call log or other interface page on the mobile phone device. For example, if an incoming call is missed, the user may access a received call log of the mobile phone device, and from this log the user may request a menu, which is displayed upon receiving the request. The menu may include an option to search for a name associated with the originating phone number of the missed incoming call. See also the description of FIGS. 3A and 3B, below. In addition or alternatively, the menu may provide a selection that causes the device to always initiate a search for the name, search for the name only if the name is not recognized by the mobile phone device, always prompt to search for the name e.g., if the name is not already discernable from the device's contact database, etc.

In a further approach, a list may be provided including one or more search methods for determining a name associated with the originating phone number. A user may choose one of the search methods from this list, and the selection may be received by the mobile phone device. Upon this selection, the mobile phone device may access the selected search method for determining a name associated with the originating phone number. Illustrative search methods include reverse phone number search, Internet search, a search of a database of a caller identification system, a request to the service provider for the name, etc.

In another approach, the mobile phone device, service provider, or other system may choose the search method automatically based on one or more factors. The factors may include cost, speed, name availability (whether the search method can retrieve a name associated with the number provided), a number of returned names, etc. Moreover, a method may be attempted and dropped or discontinued, e.g., due to a factor such as retrieval of multiple names, confusing search logic, retrieval of no names, etc., and another method used to perform the search.

In some embodiments, a name associated with the originating phone number may be determined only while the mobile phone device is not performing other tasks on a wireless network. For example, if a user is using the mobile phone device to access the internet, talk to another party, send a text message, etc., the mobile phone device may not access a remote site to determine a name associated with the originating phone number. However, once the mobile phone device is no longer being used for any such tasks, the name may then be determined. In another approach, the access of the remote site may be performed after a call at the request of the user. In other embodiments, steps in the process may be performed concurrently with other tasks.

In one approach, a name associated with the originating phone number may be determined by providing the originating phone number to a remote reverse phone number lookup service using the mobile phone device. The remote reverse phone number lookup service may retrieve a name associated with the originating phone number based on a database of such listings, and may send the name associated with the originating phone number to the mobile phone device, which receives the name. If more than one name is associated with a single originating phone number, the user, the remote reverse phone number lookup service, or some other system may choose which name(s) to return and/or whether to perform another type of search, use different search parameters, etc.

In a further approach, a name associated with the originating phone number may be determined by providing the originating phone number to a remote site which may use a caller identification (ID) database from which to retrieve the name associated with the originating phone number.

According to one embodiment, a name associated with the originating phone number may be retrieved by determining if the originating phone number is associated with a name in a phonebook of the mobile phone device first. If the originating phone number is not associated with a name in a phonebook of the mobile phone device, then a search may be performed for a name associated with the originating phone number on a remote reverse phone number lookup service, as described above. In this fashion, a search which may cost additional money and/or potentially incur data charges may be avoided if the originating phone number already has a name associated with it.

In another embodiment, the method 100 may further comprise providing a user an option to add the originating phone number and the name associated with the originating phone number to a phonebook on the mobile phone device. A phonebook on the mobile device may include an electronic address book, an address book stored on a memory module of the mobile phone device, such as a SIMM card, a phonebook that can be transferred between the mobile phone device and a computer application, such as Microsoft® Outlook®, etc. In this fashion, the phonebook on the mobile phone device may be populated with the names and phone numbers searched for with the method 100.

In some embodiments, the operations of method 100 may be performed without any input from a user. For example, the method 100 may be performed automatically whenever an incoming phone call is received by the mobile phone device. In another embodiment, the method 100 may be performed only after initiation by a user of the mobile phone device. In a further embodiment, the name may be retrieved after receiving only simple instructions, e.g., menu or other instructions without typing, from the user to retrieve the name associated with the originating phone number, preferably from within the telephone-related applet or screen set of the mobile phone device.

In particularly preferred embodiments, a remote site may be accessed for determining a name associated with the originating phone number after the originating phone number is output on the mobile phone device. In this manner, the name may be retrieved only after the phone number has been identified and output on the mobile phone device. For example, when an incoming phone call is received, if a user answers the call, a name associated with the incoming phone call may not be retrieved. However, if the call is not answered, a name associated with the originating phone number may be retrieved so that the user may review who called via accessing, e.g., a received call log and/or missed call log on the mobile phone device.

In operation 110, the name associated with the originating phone number is output on the mobile phone device. In some embodiments, the name associated with the originating phone number may be output to the mobile phone device visually by indicating the name associated with the originating phone number on a display of the mobile phone device. The name associated with the originating phone number may be output along with the originating phone number, possibly at the same time.

In another approach, the name associated with the originating phone number may be output to the mobile phone device audibly via a speaker of the mobile phone device, headphone attached thereto, Bluetooth device in communication therewith, etc. For example, when the incoming phone call is received and/or when the originating phone number is selected from an incoming phone call log, the name associated with the originating phone number may be spoken to a user, at a selectable volume level.

Figure 2:
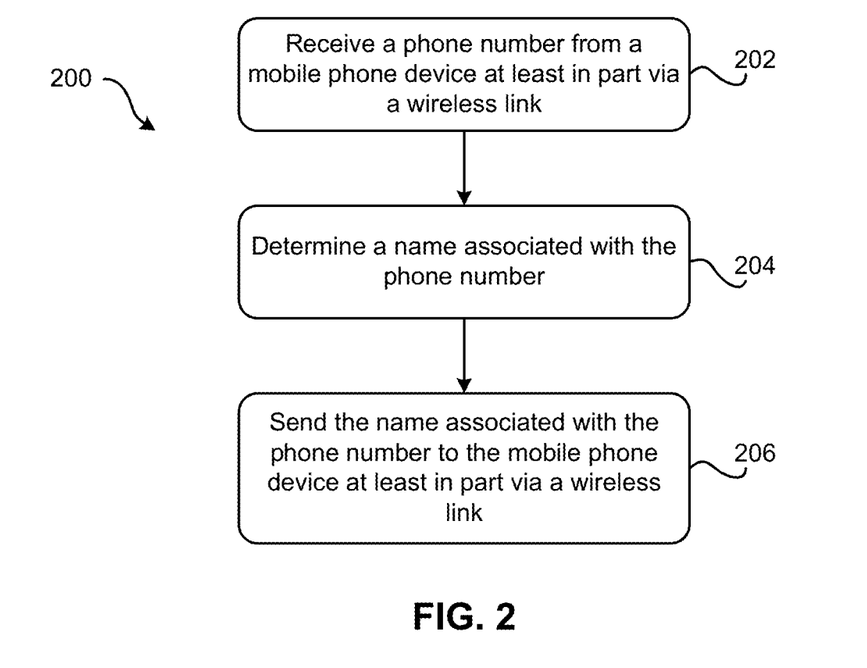
FIG. 2 depicts a method according to one embodiment.

Now referring to FIG. 2, a method 200 is shown according to one embodiment. The method 200 may be carried out in any desired environment. Preferably, the method 200 may be performed in a service provider system, in a phone number lookup service, and/or in a remote system (i.e., remote from the mobile phone device).

With continued reference to FIG. 2, in operation 202, a phone number is received from a mobile phone device at least in part via a wireless link. For example, the phone number may be sent from a mobile phone device via a wireless link to a service provider location. The service provider location may then send the phone number via a terrestrial link to another system, and so forth. Generally, the wireless link may be between a mobile phone device and some other system, such as a tower of a telephone service provider. In some embodiments, an internet connection may be used to at least in part transmit the phone number from the mobile phone device to the system performing the method 200.

In operation 204, a name associated with the phone number is determined. In some embodiments, the name may be determined through a reverse phone number lookup service, such as those found on some websites (e.g., www.whitepages.com, www.yellowpages.com, etc.), those available through database services, a caller ID database, etc.

In operation 206, the name associated with the phone number is sent to the mobile phone device at least in part via a wireless link. Once again, any portion of the transmission of the name may be sent via the wireless link. In some embodiments, an internet connection may be used to at least in part send the name to the mobile phone device.

Again, in any embodiment, any of the functions may be performed automatically, at the request of a user or the mobile phone device, at the request of a service provider, or a combination thereof.

Figure 3A:
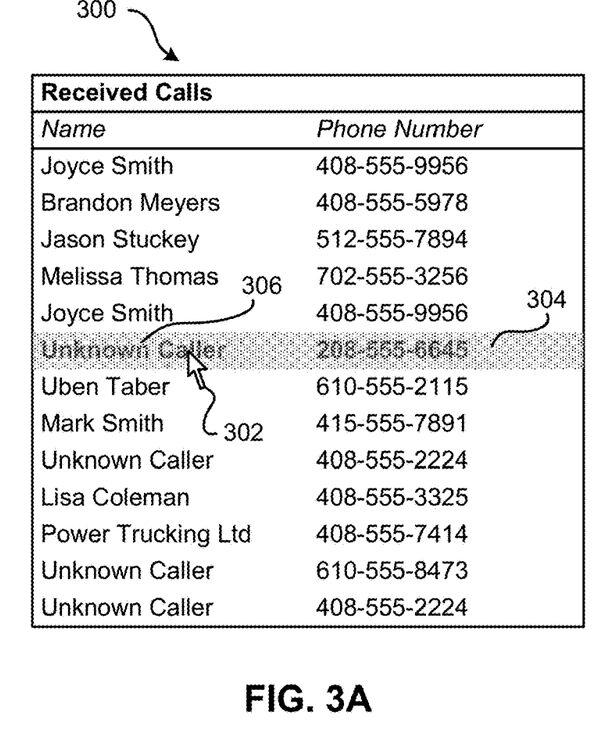
FIG. 3A shows a received call log on a mobile phone device according to one embodiment.
Figure 3B:
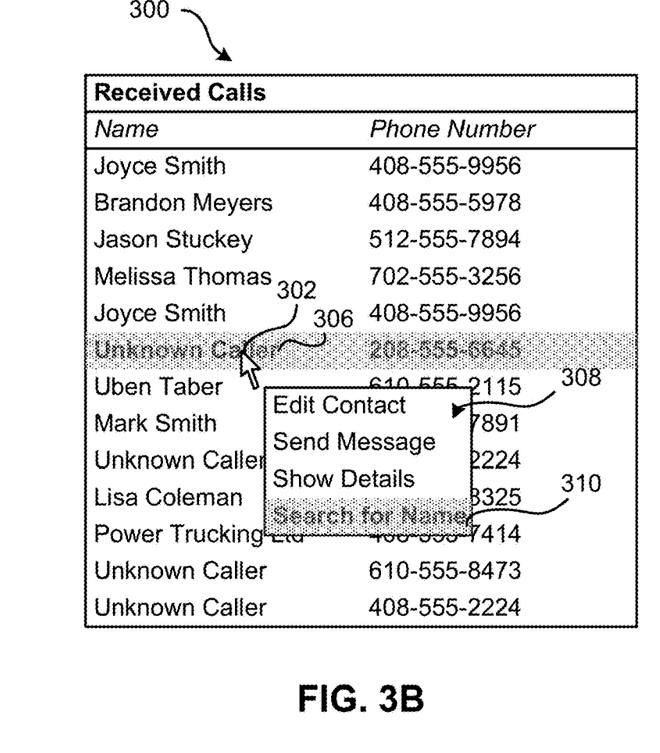
FIG. 3B shows a menu launched from a received call log on a mobile phone device according to one embodiment.

With reference to FIG. 3A-3B, a menu for accessing a remote site to search for a name associated with an originating phone number is described according to one embodiment. Any of the previously described methods may be used in conjunction with the menu described below.

In FIG. 3A, an illustrative received call log 300, that may be output to a display of a mobile phone device, is shown according to one embodiment. Here, the received call log 300 includes names (when available) and phone numbers (when available) of calls that have been received by the mobile phone device. Of course, the receive call log 300 may include more information, such as time and date of the call, call duration, costs associated with the call, etc.; or less information, such as simply the phone number and/or the name known to be associated with the number. A user may highlight an entry 304 or otherwise select one of the listed received phone calls that may or may not already have a name associated with it (e.g., unknown phone call 306) in order to activate a menu. One such method of activating a menu may be to position a cursor 302 over the unknown phone call 306 and tap with a stylus; select with a track ball, wheel, button, or some other input device or mechanism; verbal input; etc. which the mobile phone device receives as a signal that a menu is to be activated.

Now referring to FIG. 3B, a pop-up menu 308 is shown positioned just below and to the right of the cursor 302. Such a menu 308 may appear anywhere on the display of the mobile phone device, and the position indicated in FIG. 3B is exemplary only, and not meant to be limiting in any way. Furthermore, the menu may function as a separate window which, e.g., may encompass all or substantially all of the display of the mobile phone device when activated. The menu 308 may include a multitude of functions, such as editing functions, viewing functions, transmission functions, etc. Also, the menu may include a menu item 310 for searching for a name if there is not already a name associated with the originating phone number. Upon detecting selection of the search for a name menu item 310, the device may begin a process by which a name may be found, according to one or more methods described herein, to associate with the unknown phone call 306.

Figure 4:
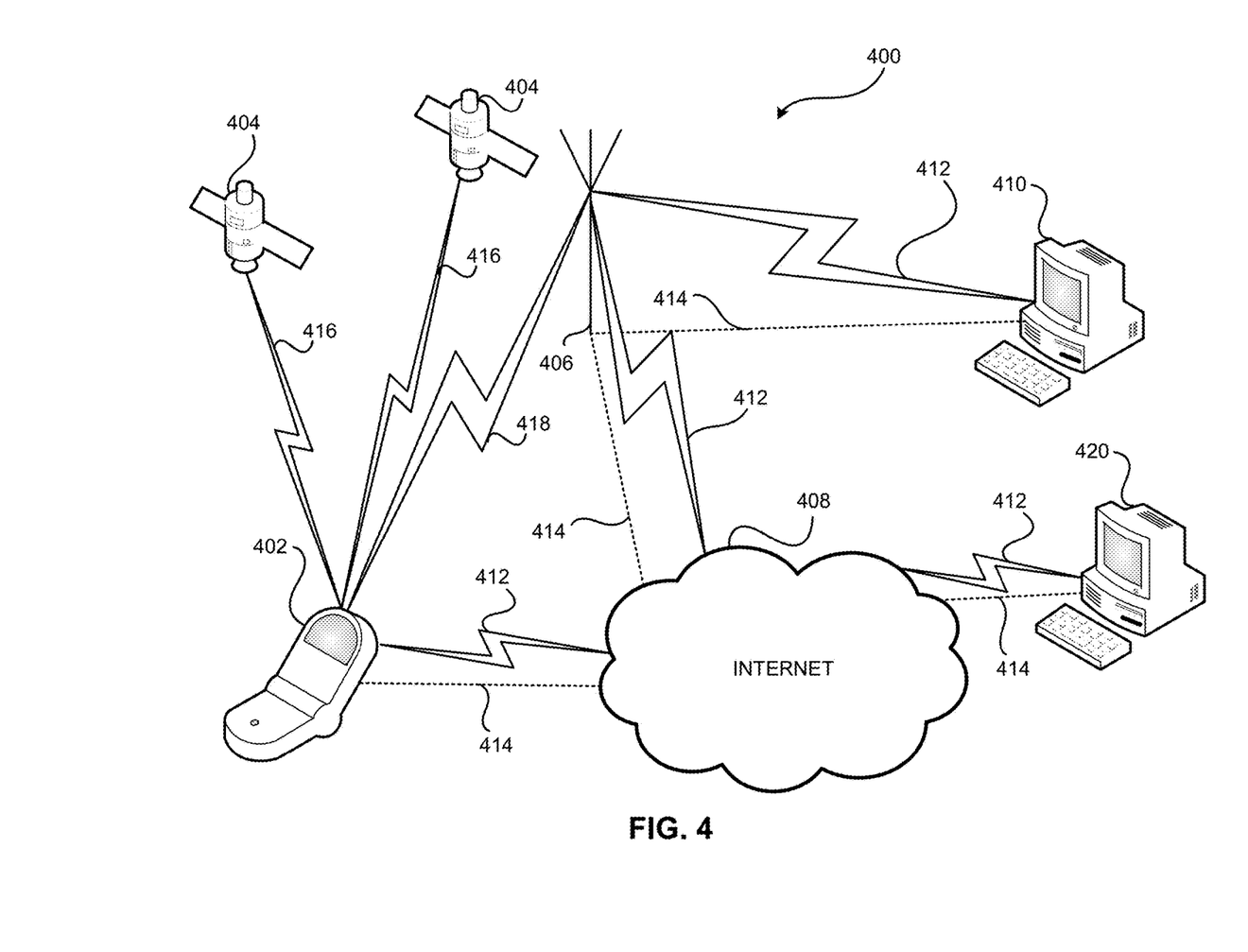
FIG. 4 shows an environment in which the invention may be carried out according to one embodiment.

With reference to FIG. 4, an environment in which the present invention may be carried out is shown according to one embodiment. A mobile phone device 402 may connect to a server computer 410 through any number of hardwired links 414 and/or wireless links 412, 418. Generally, the mobile phone device 402 connects to a local tower 406 through a wireless connection 418, and the tower 406 connects to the server computer 410. Additionally, the mobile phone device may connect to the internet 408 through a connection with the tower 406. The internet 408 may also provide a link from the mobile phone device 402 to other servers or computers 420 through wireless links 412 and/or hardwired links 414. The mobile phone device 402 may also connect via wireless links 416 to one or more satellites 404 for communication and/or location functionality. In some embodiments, the mobile phone device 402 may connect to the internet via a hardwired and/or other wireless link, e.g., WiFi connection, etc. The program environment in which a present embodiment of the invention may be executed illustratively incorporates one or more general-purpose computers or special-purpose devices. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Additionally, some or all of the aforementioned code may be embodied on any physical computer readable storage media including tape, FLASH memory, system memory, hard drive, etc. Additionally, a data signal embodied in a carrier wave (e.g., in a network including the Internet) can be the computer readable storage medium.

Further embodiments may extend to telephone messaging, such as text messaging, Short Message Service (SMS) messaging, Multimedia Messaging Service (MMS) messaging, etc. and other device to mobile-device non-phone-call communications. Thus, in addition to the functionality presented above in conjunction with telephone calls, embodiments may include methodology to find and/or output the name associated with a message received from another phone. As with telephone calls, messages received from a device may include the phone number of the user or entity sending the message or owning the device from which the message originated. Thus, similar approaches to those presented herein may be used to determine the name associated with the number from which the message originated. Moreover, some embodiments may provide similar features as presented herein in conjunction with telephone messaging and other device to mobile-device non-phone-call communications while perhaps not having such functionality for telephone calls. Thus, various embodiments may provide functionality relating to telephone calls, other types of communication, or both telephone calls and other types of communication.

In another approach, a phone number associated with an outgoing phone call and/or message is presented to a user, who may initiate retrieval and output of the name associated with the phone number, preferably via menu commands. The name associated with the phone number may be output after receipt. Thus, a concerned parent may check to whom their child is sending messages or making phone calls.

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

EXAMPLES

In one example, a person may request output of a mobile phone's received call log to review calls that were missed while the mobile phone was in a locker during a workout. The mobile phone may scroll through the received call log at the user's request and display a phone number that is listed but which does not have a name associated with it on the mobile phone. Unless the user knows the phone number by memory, he cannot identify who called his phone. However, upon detecting selection of the unknown call from the received call log, the mobile phone presents a menu which provides a selection to search for a name associated with the phone number. After receiving selecting this menu item, the mobile phone accesses a remote site (such as www.whitepages.com) to determine a name associated with the originating phone number. The mobile phone may even display a charge that will be incurred in order to search for the name. In this event, the user may need to click on an acceptance box before continuing with the search. In any event, if the search is requested, performed and is positive, the mobile phone receives a name associated with the phone number, and displays this name along with the originating phone number in the received call log. In addition, the mobile phone may provide an option for the user to add this name and phone number into a phonebook on the mobile phone, e.g., via a menu item, etc. If the user chooses to do this, each time a call is received from this number in the future, the mobile phone may display the name associated with that number.

In another example, a Blackberry® device may be unattended and receive several calls, some of which may not have names already associated with the originating phone numbers on the device. The Blackberry® device may have a setting that a user has selected where the device searches for names associated with unknown phone calls, optionally whenever it is not otherwise accessing a wireless link, such as for providing a telephone connection, internet connection, text message connection, etc. If the device is not being used (or even if it is in use), the device may request or perform a search for names associated with each of the unknown phone calls it has received while being left unattended. If the searches are successful, then the device may populate the received call log with the names associated with the phone calls received. This way, when the user returns to access the Blackberry® device, she can review the received call log and determine who called, even if the callers' names are not present in the device's phonebook.

In yet another example, a user may receive an incoming phone call from an unknown number on a wireless device, such as an Apple® iPhone®, and the user may want to known the origination of the call before answering. The user may be presented the option to search for any information associated with the incoming phone number, and once this option is selected, the wireless device may initiate lookup the information associated with the incoming phone number while the wireless device continues to ring. Alternatively, the mobile device may answer the incoming call and place it into a "holding" state while the associated information is retrieved. In this way, the user may have the option as to whether she wants to answer the call once the associated information is output to the wireless device. For example, if the information returned to the wireless device indicates that the call is originating from a debt collector based out of Florida, and the user does not wish to answer such a call, the user may disregard the call, and it may go to voicemail, or may select an option on the device which will hang up the call that was previously in a "holding" state, thereby not allowing the debt collector to leave a message.

In a further example, a user receives a text message. The user does not recognize the telephone number from which the text message originated, so a request for a name associated with that number is initiated using any approach presented herein. Upon receiving the name associated with the telephone number, it is output and optionally or selectively associated with the telephone number. Moreover, the name may be displayed in conjunction with the text message, e.g., in a log of received messages.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving an incoming phone call on a mobile phone device;
   determining an originating phone number from which the incoming phone call originated;
   outputting the originating phone number of the incoming phone call on the mobile phone device;
   providing to a user, in a menu accessible from a call log of the mobile phone device, an option to perform a phone number search to determine a name associated with the originating phone number of the incoming phone call, wherein if the user does not choose to perform a phone number search, then the name associated with the originating phone number of the incoming phone call is not determined;
   providing a list including at least one search method for determining a name associated with the originating phone number of the incoming phone call;
   receiving, from the user, a selection of a search method from the list; and
   accessing a selected search method for determining a name associated with the originating phone number of the incoming phone call, including:
      providing to a remote site the originating phone number of the incoming phone call;
      accessing the remote site for determining a name associated with the originating phone number of the incoming phone call; and
      accessing the remote site for determining additional information associated with the originating phone number of the incoming phone call, the additional information comprising a social network webpage and a mailing address; and
   outputting the name and additional information associated with the originating phone number of the incoming phone call on the mobile phone device.

2. The method of claim 1, further comprising:
   identifying an originating phone number of a missed incoming call;
   providing to the remote site the originating phone number of the missed incoming call;
   receiving from the remote site a name associated with the originating phone number of the missed incoming call;
   receiving a request from the user for a received call log; and
   displaying the name associated with the originating phone number of the missed incoming call within the received call log.

3. The method of claim 1, wherein determining the name associated with the originating phone number of the incoming phone call is performed only while the mobile phone device is not performing other tasks on a wireless network.

4. The method of claim 1, wherein determining the name associated with the originating phone number of the incoming phone call further comprises:
   providing the originating phone number of the incoming phone call to a remote reverse phone number lookup service using the mobile phone device; and
   receiving a name associated with the originating phone number of the incoming phone call.

5. The method of claim 4, wherein determining the name associated with the originating phone number of the incoming phone call is performed by providing the originating phone number of the incoming phone call to a remote site using a caller identification (ID) database.

6. The method of claim 1, wherein outputting the name associated with the originating phone number of the incoming phone call to the mobile phone device comprises visually indicating the name associated with the originating phone number of the incoming phone call on a display of the mobile phone device.

7. The method of claim 1, wherein outputting the name associated with the originating phone number of the incoming phone call to the mobile phone device comprises audibly indicating the name associated with the originating phone number of the incoming phone call via a speaker of the mobile phone device.

8. The method of claim 1, wherein determining the name associated with the originating phone number of the incoming phone call comprises:
   determining if the originating phone number of the incoming phone call is associated with a name in a phonebook of the mobile phone device; and
   in response to determining that the originating phone number of the incoming phone call is not associated with a name in a phonebook of the mobile phone device, requesting performance of a search for a name associated with the originating phone number of the incoming phone call on a remote reverse phone number lookup service.

9. The method of claim 1, further comprising providing a user an option to add the originating phone number of the incoming phone call and the name associated with the originating phone number of the incoming phone call to a phonebook on the mobile phone device.

10. The method of claim 1, wherein the method is performed without any input from a user.

11. The method of claim 1, wherein accessing the remote site for determining the name associated with the originating phone number of the incoming phone call is performed after the outputting the originating phone number of the incoming phone call on the mobile phone device.

12. The method of claim 1, further comprising:
receiving an incoming message on the mobile phone device, the incoming message comprising at least one of: a text message, a video message, and a picture message;
determining a phone number from which the incoming message originated;
outputting the originating phone number of the incoming message on the mobile phone device;
accessing the remote site for determining a name associated with the originating phone number of the incoming message;
determining additional information associated with the originating phone number of the incoming message, the additional information comprising at least one of: a social network webpage, a work webpage, a personal webpage, a home address, a work address, a mailing address, a billing address, and an alternate phone number; and
outputting the name and additional information associated with the originating phone number of the incoming message on the mobile phone device.

13. A system, comprising:
a processor; and
logic integrated with and/or executable by the processor to cause the processor to:
  receive an incoming phone call on a mobile phone device; and
  determine an originating phone number from which the incoming phone call originated;
a display that:
  outputs the originating phone number of the incoming phone call on the mobile phone device;
the logic further causing the processor to:
provide to a user, in a menu accessible from a call log of the mobile phone device, an option to perform a phone number search to determine a name associated with the originating phone number of the incoming phone call, wherein if the user does not choose to perform a phone number search, then the name associated with the originating phone number of the incoming phone call is not determined;
provide a list including at least one search method for determining a name associated with the originating phone number of the incoming phone call;
receive from the user, a selection of a search method from the list; and
access a selected search method for determining a name associated with the originating phone number of the incoming phone call, including:
  providing to a remote site the originating phone number of the incoming phone call;
  accessing the remote site to determine a name associated with the originating phone number of the incoming phone call; and
  accessing the remote site to determine additional information associated with the originating phone number of the incoming phone call, the additional information comprising a social network webpage and a mailing address;
wherein the display further outputs the name and additional information associated with the originating phone number of the incoming phone call on the mobile phone device.

14. The system of claim 13, further comprising logic integrated with and/or executable by the processor to cause the processor to output, on the mobile phone device, a cost of determining the name associated with the originating phone number of the incoming phone call along with the option to perform the phone number search.

15. The system of claim 13, wherein outputting the name associated with the originating phone number of the incoming phone call on the mobile phone device comprises visually and audibly indicating the name associated with the originating phone number of the incoming phone call.

16. A computer program, comprising:
a non-transitory computer readable storage medium having computer program code embodied therewith, wherein the computer program code is readable and/or executable by a processor to cause the processor to:
  receive an incoming phone call on a mobile phone device;
  determine an originating phone number from which the incoming phone call originated;
  output the originating phone number of the incoming phone call on the mobile phone device;
  provide to a user, in a menu accessible from a call log of the mobile phone device, an option to perform a phone number search to determine a name associated with the originating phone number of the incoming phone call, wherein if the user does not choose to perform a phone number search, then the name associated with the originating phone number of the incoming phone call is not determined;
  provide a list including at least one search method for determining a name associated with the originating phone number of the incoming phone call;
  receive, from the user, a selection of a search method from the list; and
  access a selected search method for determining a name associated with the originating phone number of the incoming phone call, including:
    providing to a remote site the originating phone number of the incoming phone call;
    accessing the remote site to determine a name associated with the originating phone number of the incoming phone call; and
    accessing the remote site to determine additional information associated with the originating phone number of the incoming phone call, the additional information comprising a social network webpage and a mailing address; and
  outputting the name and additional information associated with the originating phone number of the incoming phone call on the mobile phone device.

\* \* \* \* \*